United States Patent
Barthuly

(10) Patent No.: US 6,206,030 B1
(45) Date of Patent: Mar. 27, 2001

(54) INSULATING COVER FOR WATER BACKFLOW PREVENTION APPARATUS

(75) Inventor: Larry D. Barthuly, Carmel, IN (US)

(73) Assignee: Barthuly Irrigation, Inc., Zionsville, IN (US)

( * ) Notice: Subject to any disclaimer, the term of this patent is extended or adjusted under 35 U.S.C. 154(b) by 0 days.

(21) Appl. No.: 09/638,986

(22) Filed: Aug. 15, 2000

(51) Int. Cl.[7] ................................................. F16L 53/00
(52) U.S. Cl. ........................ 137/341; 137/377; 137/382; 137/375; 239/276
(58) Field of Search ............................ 137/377, 382, 137/375, 341; 239/276

(56) References Cited

U.S. PATENT DOCUMENTS

| D. 300,555 | 4/1989 | Patterson | D23/249 |
|---|---|---|---|
| D. 346,432 | 4/1994 | VanMeter | D23/249 |
| D. 349,754 | 8/1994 | Pawar et al. | D23/249 |
| 2,985,552 | 5/1961 | Watanabe . | |
| 3,858,632 | 1/1975 | Stout | 150/52 R |
| 4,142,565 | 3/1979 | Plunkett, Sr. | 150/52 R |
| 4,244,394 | 1/1981 | Hartselle, III | 137/375 |
| 4,456,027 | 6/1984 | Belgard | 137/375 |
| 4,890,638 * | 1/1990 | Davenport | 137/382 |
| 4,993,450 * | 2/1991 | Dunn | 137/382 |
| 5,740,832 * | 4/1998 | Griffin et al. | 137/341 |
| 5,878,776 | 3/1999 | Love | 137/375 |
| 6,021,804 * | 2/2000 | Griffin et al. | 137/341 |

* cited by examiner

Primary Examiner—A. Michael Chambers
Assistant Examiner—Thomas L. McShane
(74) Attorney, Agent, or Firm—Woodard, Emhardt, Naughton, Moriarty & McNett

(57) ABSTRACT

A thermal insulating bag, with a waterproof outside surface and a heat-reflecting inside surface, is installed, open end downward, over a backflow prevention valve and the associated above-ground water pipes, to cover them. The bag has ballast contained in a hem around the perimeter of the open end, enabling the open end of the bag to conform to and seal against an irregular ground surface. The bag is flexible and can be rolled up or folded flat or in any desired configuration for storage. The ballast material, being heavy, holds the bag down on the ground and, being fluid-like, enables the perimeter of the open end to engage the contour of the ground throughout the perimeter to provide an effective cover-to-ground seal. Tabs extend outward at the open end and have holes in them to enable installation of anchor stakes, to anchor the lower end of the bag to the ground, desired. One embodiment electrically heated.

14 Claims, 2 Drawing Sheets

INSULATING COVER FOR WATER BACKFLOW PREVENTION APPARATUS

BACKGROUND OF THE INVENTION

1. Field of the Invention

This invention relates generally to outdoor area irrigation systems, and more particularly to apparatus for prevention of freezing of water in exposed components.

2. Description of the Prior Art

In communities where water for outdoor irrigation systems for lawns and gardens and the like are supplied by a public or private water utility, governmental codes or ordinances typically require, at the user site, a backflow preventer at the connection from the utility supply to the user's system. The purpose is to prevent flow of contaminated water backward from the user system into the potable water system of the utility due to back-siphoning conditions.

One type of backflow prevention apparatus widely used in lawn irrigation systems is a pressure vacuum breaker valve assembly mounted above ground very close to the water meter and between the water outlet from the meter and the inlet to the irrigation system. During the fall of the year, when ambient temperatures are dropping, it sometimes happens that there is an unseasonable and unusually sharp drop in ambient temperature below the freezing mark. The ground is still warm so there is virtually no danger of water freezing in the underground pipes. However, the backflow preventer valve assembly and the pipes leading to and from it, are above ground.

While it is customary to drain lawn irrigation systems during the fall of the year in the colder climates, it often happens that the owner or manager of the property on which the irrigation system is installed, wants irrigation to continue until a time well into the fall of the year, to maintain the appearance of the property. So, the draining of the system may be delayed until a sudden drop in ambient temperature is predicted. The owner, manager or irrigation service provider frequently does not have the time to drain all of the systems before the temperature drops below freezing. Therefore, the above ground pipes to and from the backflow preventer valve, and which are still pressurized, have water in them which is subjected to the freezing temperatures and can freeze, resulting in breakage of the valve assembly and associated above-ground piping, and significant loss of water (particularly where the property is unattended) when the temperature rises again to normal ambient for that time of the year. The result is significant cost for repair and wasted water, and possible water damage.

Various insulating devices to prevent freezing pipes and hose bibs have been devised. The closest one of which I am aware for a backflow prevention water valve is shown in U.S. Pat. No. Des. 349,754. Irrigation systems are of various sizes and capacities, depending on the area to be irrigated and the available water supply pressures and volume. Therefore, the backflow preventer apparatus also is available in various sizes and types, to accommodate the overall system. In addition, the terrain is not always level, and the surface at the location of the preventer apparatus may be irregular.

It is an object of the present invention to provide a device for reducing the risk of freezing of water in backflow prevention apparatus subjected to transient below-freezing ambient temperatures.

SUMMARY OF THE INVENTION

Described briefly, according to a typical embodiment of the present invention, a cover, somewhat in the nature of a pillow slip, is made of thermal insulating material, preferably with a waterproof outside surface and a heat-reflecting inside surface. The cover has an open bottom end like a pillow slip but with a closed hem containing a relatively dense liquid or fluid-like solid granular or pelletized or powered material surrounding the bottom opening. The cover is foldable flat or in any desired configuration for storage. To cover the backflow preventer apparatus, according to the method of the invention, the cover is installed, open end down, over the backflow prevention apparatus, and the entire perimeter of the lower edge is engaged with the ground surface. The fill material, being heavy, holds the cover down on the ground and, being fluid-like, enables the perimeter of the open end to engage the contour of the ground throughout the perimeter to provide an effective cover-to-ground seal. Apertured tabs are provided at the hem to enable installation of anchor stakes, if desired.

DESCRIPTION OF THE ILLUSTRATED EMBODIMENT

Figure 1:
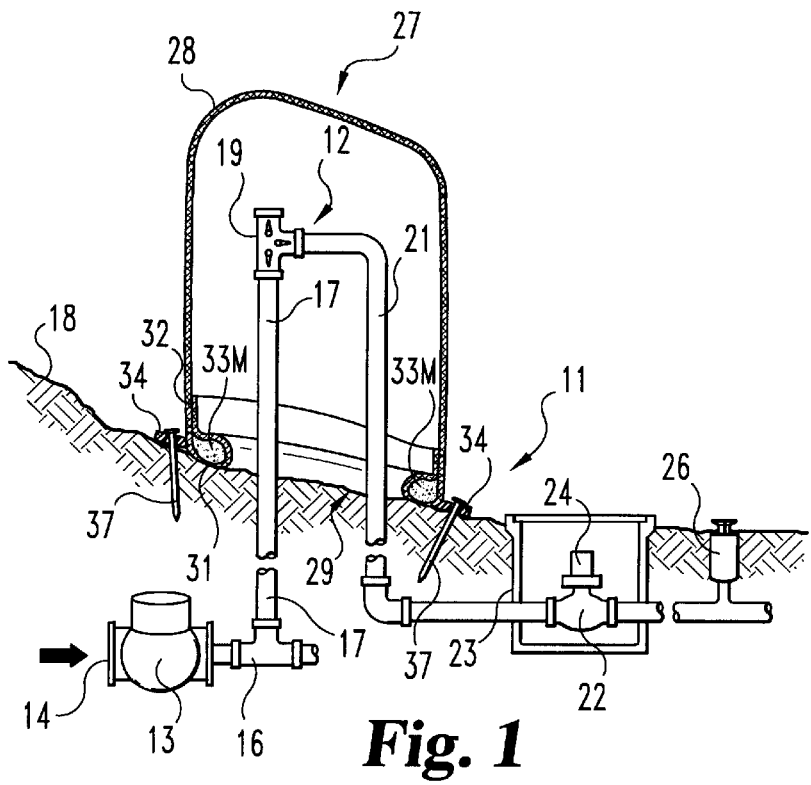
FIG. 1 is an elevational view showing, schematically an installation site of a backflow prevention assembly on a hillside with irregular ground surface and showing, in cross section, a cover according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows a hillside ground installation site 11 of a backflow prevention apparatus 12. An underground water meter 13 is shown schematically and out of scale in terms of depth in the ground and location relative to the preventer valve assembly. The meter has input at 14 from a water utility, and output 16 which is connected to a water system in a building or other utilization site (not shown) on the property. A branch 17 from the meter output extends upward through the ground 18 to the backflow preventer valve assembly 19. Pipe 21 extends from the outlet of the valve assembly down into the ground and to a sprinkler system control valve 22, typically located in a box 23 and having an electrically operated solenoid 24 therein to control water to the distribution system including, for example, a sprinkler head 26. This equipment is conventional.

According to the illustrated embodiment of the present invention, an insulated cover assembly 27 is provided. This includes a cover in the form of a bag 28 shown in section in FIG. 1 and open at the bottom. The bottom is defined by the lower edge 31 of the opening and, in the illustrated example, the bag material is formed into a hem sealed to the interior at 32 and forming a tube 33 around the entire perimeter of the bag at the bottom. This base tube is filled with a flowable filler material, typically in the form of dry sand which has a greater density, by weight, than the material of the bag itself. Also, since the bag material itself is flexible, and the filler material is flowable, the lower edge 31 of the bag conforms precisely to the contours of the ground at the installation site. In addition, the filler material causes the bag to snugly engage the ground entirely around the perimeter of the bag opening, even though the surface of the ground is irregular as shown. Thus, it provides ballast for the cover. While the bag material is flexible, it is preferable that the tubular portion be sufficiently inelastic, to avoid the flowable material flowing to the lowest point in a hillside installation, and thereby avoid depriving upper portions of the tube of the seating ballast. For additional security, if needed, particularly on a hillside as shown, tabs 34 are provided at the bottom of the bag and have apertures 36 therein to receive stakes 37 which can be driven into the ground to further anchor the bag. Additional tabs may be provided if desired.

Figure 2:
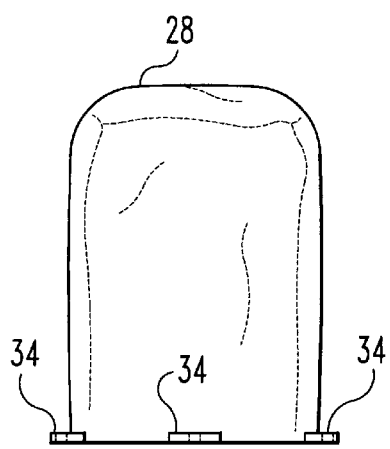
FIG. 2 is a view of the cover itself in a totally relaxed state.
Figure 3:
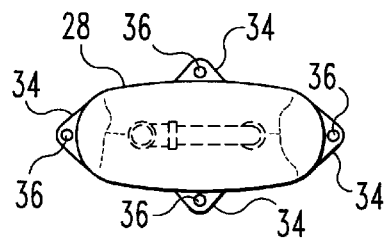
FIG. 3 is a top plan view of the cover as installed in FIG. 1 and showing the backflow preventer valve assembly in phantom, and not showing anchor stakes.
Figure 4:
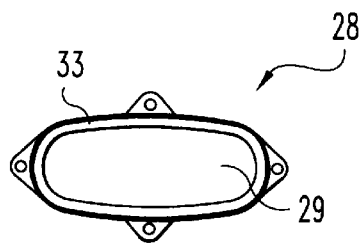
FIG. 4 is a bottom plan view of the cover.
Figure 5A:
FIG. 5A is a bottom plan view of the cover flattened for folding or rolling up for storage.
Figure 5B:
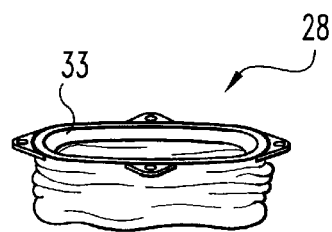
FIG. 5B is a perspective view of the cover flattened and bunched for storage.

In the use of the cover, it can be erected from a relatively flat state as shown in FIG. 5A and 5B or a rolled-up or folded state, however one has stored it. Then the bottom is opened up from the configuration of FIG. 5 to that of FIG. 4, simply by pulling the opening open by hand and sliding the cover down over the backflow prevention apparatus and downward until the lowered edge 31 meets the ground all the way around the prevention apparatus. Since the bag material is so flexible, it can deform from the normal, as-manufactured configuration shown in FIG. 2, to the configuration shown in FIG. 1 to adapt to the grade and contour of the ground surface. The weight of the flowable material 33M in the tubular portion at the bottom, holds the bag down and in compliance with the slope and irregularities in the ground surface. As mentioned above, if additional security is desired, stakes 37 can be driven through the apertures 36 in the tabs. Of course, if the backflow prevention apparatus happens to be installed on level, smooth ground at the site, it can be installed just as easily, and can be staked if desired. The ground surface can be dirt, gravel, mulch, grass, or any other surface likely to be encountered at an installation site for a backflow preventer.

Figure 6:
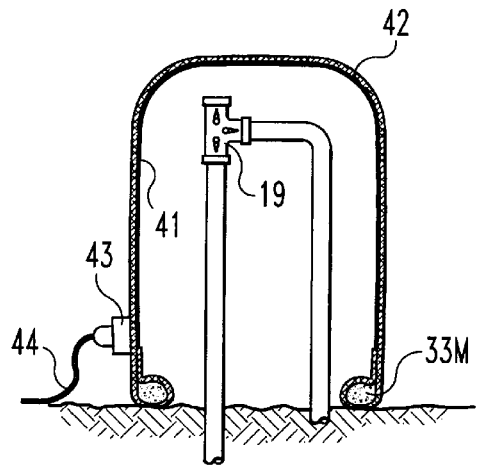
FIG. 6 is a view like FIG. 1 but showing an embodiment with electrically heated cover.

FIG. 6 is an illustration of another embodiment of the invention in which an electrical heating element 41 is embedded in the cover material 42 much in the same manner as in an electric blanket, and is supplied by a battery pack 43 which can be plugged into an electric supply cord 44 for recharging or direct supply from an electrical power source available at or near the site. In this case, the amount or quality of the insulating material itself need not be as great, as long as the power supply, and battery duration, if unplugged, are adequate for the period of the temperature drop.

The flowable ballast material in the perimeter tube at the bottom of the cover in both embodiments, can be any of a variety of relatively heavy materials. Examples are sand, pellets of metal, or a liquid not likely to freeze in cold climates where irrigation is employed. It is desirable that the cover material itself be waterproof on the outside and have a reflective interior surface so that heat in the ground tending to pass outward into the enclosure provided by the cover, will be reflected back toward the ground and thus surround the water containing components of the backflow prevention apparatus, and inhibit freezing. Of course, the material should have an insulating capability of its own such as is common in garments, sleeping bags and other insulating shell-type of materials. One example of a man-made material which may be useful for this purpose is Gortex® as produced by the W. R. Grace Company, Inc. Another is SympaTex® by Akzo Nobel Faser AKG. of Wuppertal Germany. Another is Polartec® by Malden Mills Industries, Inc. of Lawrence MA. As suggested above, the cover can be provided in various sizes and shapes to accommodate some various types and sizes of backflow prevention apparatus. Two of many possible examples of sizes are: 30 inches high by 15 inches wide by 15 inches long, and 36 inches high by 15 inches wide by 30 inches long.

The present invention makes it easy for the property owner, manager, custodian or attendant, to quickly address the matter of a sharp drop of ambient temperature to a level below freezing, and thereby avoid damage to the above-ground components of an irrigation system. The cover assembly can be conveniently installed and removed, according to need.

While the invention has been illustrated and described in detail in the drawings and foregoing description, the same is to be considered as illustrative and not restrictive in character, it being understood that only two embodiments have been shown and described and that all changes and modifications that come within the spirit of the invention are desired to be protected.

What is claimed is:

1. A cover for a water backflow prevention apparatus comprising:

a bag of thermal insulating material and having an opening and having a tubular portion at the opening; and a flowable material in the tubular portion and having a higher weight density than the bag to assist in holding the cover in place covering the apparatus.

2. The cover of claim 1 and wherein:

the bag has a waterproof outside surface and a heat-reflecting inside surface.

3. The cover of claim 1 and wherein:

the flowable material is sand.

4. The cover of claim 1 and wherein:

the flowable material is pellets.

5. The cover of claim 1 and wherein:

the flowable material is a liquid.

6. The cover of claim 1 and wherein:

the tubular portion is a hem in the bag material.

7. The cover of claim 1 and further comprising:

electrical heating means in the bag material.

8. A method of covering water backflow prevention apparatus and comprising the steps of:

taking a bag of thermal insulating material and which has an open end, and installing the bag, open end down, by moving it downward over the backflow prevention apparatus;

conforming the open end of the bag to the ground contour around the perimeter of the open end and thereby seating the open end to the ground around the apparatus.

9. The method of claim 8 and further comprising the step of:

ballasting the open end around its perimeter to assist in seating the open end around its perimeter to the ground.

10. The method of claim 8 and further comprising the step of:

staking the open end to the ground.

11. At a ground irrigation system supply site, the combination comprising:

a water backflow prevention vacuum breaker valve;

a water supply pipe rising from the ground to the valve;

a water distribution pipe descending from the valve to the ground;

a thermal insulating bag covering the valve and pipes and contacting the ground entirely around the area occupied by the pipe and the breaker valve; and means on said bag at the ground-contacting portion of the bag, to maintain ground contact of the bag entirely around said area.

12. The combination of claim 11 and wherein:

means to maintain comprise stake receiver anchor tabs and stakes received through said tabs and anchored in the ground.

13. The combination of claim 11 and wherein:

said means to maintain comprise a flowable material.

14. The combination of claim 13 and wherein:

at least part of the ground-contacting portion is tubular and relatively inelastic to control movement of the flowable material.

\* \* \* \* \*